UNITED STATES PATENT OFFICE.

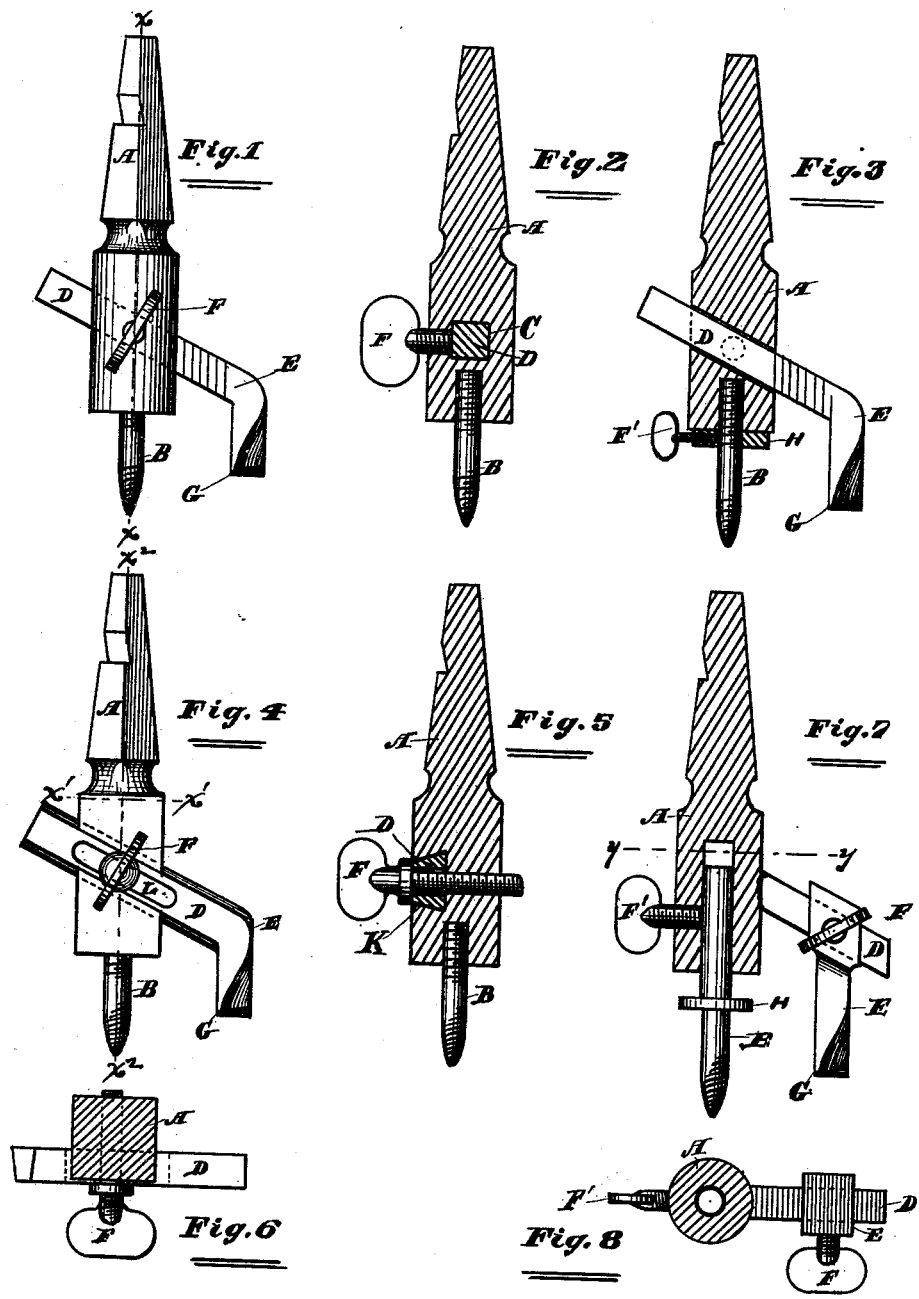

CALEB BRINTON, OF CHICAGO, ILLINOIS.

IMPROVEMENT IN AUGERS.

Specification forming part of Letters Patent No. 221,391, dated November 11, 1879; application filed July 28, 1879.

*To all whom it may concern:*

Be it known that I, CALEB BRINTON, of Chicago, in the county of Cook and State of Illinois, have invented new and useful Improvements in Augers, of which the following is a specification.

The invention relates to an expansive bit for turning off the ends of furniture-legs, handles, and other articles, for the purpose of fitting on rings, sockets, or ferrules, which invention consists in a bit-shank made of suitable shape at one end to be held in a brace or chuck, and in the other end of the shank is a pivotal pin or boring-bit, (which is preferably stationary within said shank,) which, upon entering the wood, forms a center for the rotating of the bit-shank and cutter. At a proper distance from the lower end of the bit-shank is a hole, which is of suitable shape relatively to the shape of the cutter-bar to prevent the latter from turning therein. The cutter-bar is placed into said hole, and is retained therein by means of a set-screw. The cutter is provided with a tapering and a horizontal cutting-edge; but when the turned periphery is to be parallel with a central line of the article, then the vertical cutting-edge may be omitted.

As the diameter and depth of most ferrules for any particular purpose vary uniformly, I prefer to place the cutter-bar within the bit-shank at an angle, so that by a single adjustment of the bar the bit is set for the diameter and depth of the cut to be made. If, however, a variation of the longitudinal cut is desired, it can be done by adjusting the length of the lower end of the bit-shank by means of an adjustable collar attached to the pivotal pin or bit.

In the accompanying drawings, in which similar letters of reference indicate like parts, Figure 1 is a front view of my invention. Fig. 2 is a vertical section taken on the line $xx$, Fig. 1. Fig. 3 is a vertical section of the same, showing a collar on the pivotal pin. Fig. 4 is a front view of a modification of my invention. Fig. 5 is a vertical section on line $x^2 x^2$, Fig. 4. Fig. 6 is a horizontal section on line $x' x'$, Fig. 4. Fig. 7 is a vertical sectional view of a modification of my cutter. Fig. 8 is a horizontal section of the same, taken on the line $yy$, Fig. 7.

At the lower end of the bit-shank A is the pivotal pin B, Fig. 1. In the diagonal hole C, through the shank A, Fig. 2, the cutter-bar D of the cutter E is placed, as shown in Figs. 1 and 3, and is retained in position for the desired depth and diameter of the cut to be made by means of the thumb-screw F, as shown in Figs. 1 and 2. The said cutter is provided with vertical and horizontal cutting-edges G, Figs. 1 and 3. Attached to the pivotal pin B, Fig. 3, is the adjustable collar H, with a set-screw, F', fastened within said collar, by which the depth of the cut is regulated for fitting ferrules of irregular dimensions. The bit-shank A of modification has a notch, K, in its side, as shown in Fig. 5, to receive the bit E, as shown in Fig. 4, which is held in place by means of the screw F passing through the slot L of the cutter-arm D, as shown in Figs. 4, 5, and 6.

Fig. 7 shows the bit-shank A with a stationary arm, D, to which is attached the cutter E by the aid of the thumb-screw F, as shown in Figs. 7 and 8. The said shank is further provided with a movable pivotal pin, B, which has a fixed disk, H, the said pin being adjustable within the shank A by the set-screw F', as shown in Figs. 7 and 8.

What I claim as new is—

1. A diagonally-mortised bit-shank and cutter with diagonal bar, in combination with a retaining device, substantially as described.

2. A pivotal boring-bit provided with a stop or collar, in combination with a bit shank, substantially as described.

CALEB BRINTON.

Witnesses:
W. S. BAKER,
C. B. BAKER.